United States Patent [19]

Eslami

[11] 4,170,978

[45] Oct. 16, 1979

[54] ROTARY ENGINE

[76] Inventor: Ali Eslami, Malek Abad Arsham 2, Mashad, Iran

[21] Appl. No.: 893,440

[22] Filed: Apr. 4, 1978

[51] Int. Cl.² .................................................. F02B 53/00
[52] U.S. Cl. .................................................... 123/239
[58] Field of Search ............... 123/222, 234, 236, 237, 123/238, 239

[56] References Cited

U.S. PATENT DOCUMENTS

| | | | |
|---|---|---|---|
| 904,974 | 11/1908 | Lee | 123/239 |
| 1,294,834 | 2/1919 | Rothweiler | 123/239 X |
| 2,373,304 | 4/1945 | Garbeth | 123/239 X |
| 2,461,757 | 2/1949 | Moores | 123/239 X |
| 3,858,560 | 1/1975 | Harrington | 418/36 |
| 3,861,362 | 1/1975 | Kenyon | 123/239 |

FOREIGN PATENT DOCUMENTS

| | | | |
|---|---|---|---|
| 820673 | 8/1937 | France | 123/239 |
| 622734 | 6/1961 | Italy | 123/237 |

*Primary Examiner*—Michael Koczo
*Attorney, Agent, or Firm*—Sherman Levy

[57] ABSTRACT

A rotary member is provided that includes a housing having a pair of rotors mounted therein, and wherein there is provided a shaft having a channel or passageway therein that selectively communicates with the chambers in which the rotors turn. The rotary machine is constructed and operates without the use of a crank shaft, cam shaft, and wherein the machine is air cooled.

1 Claim, 10 Drawing Figures

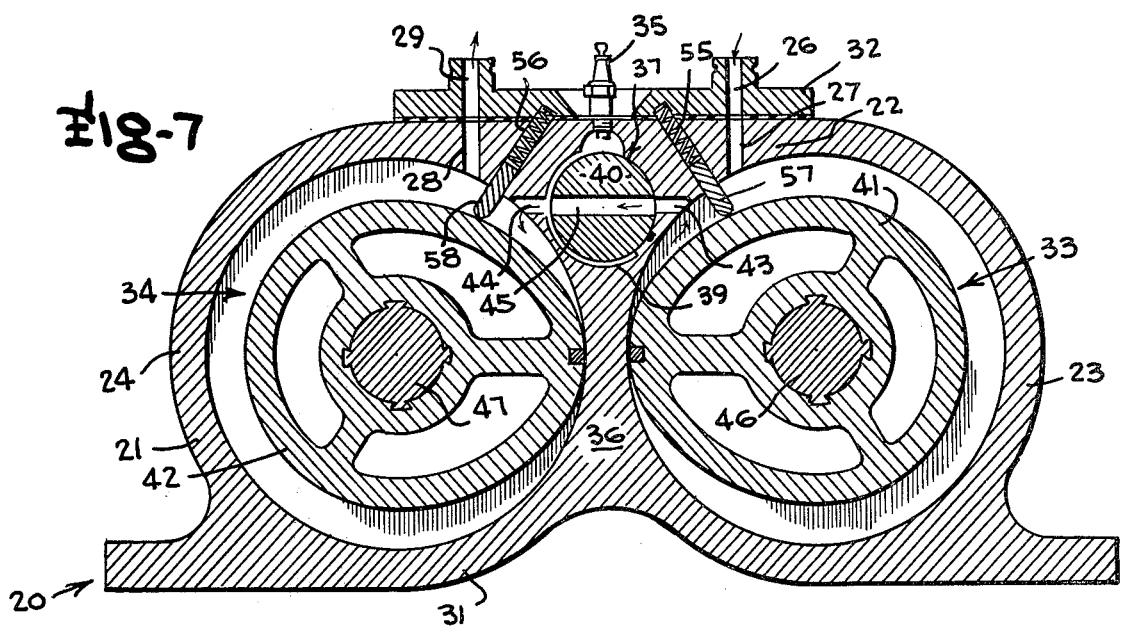
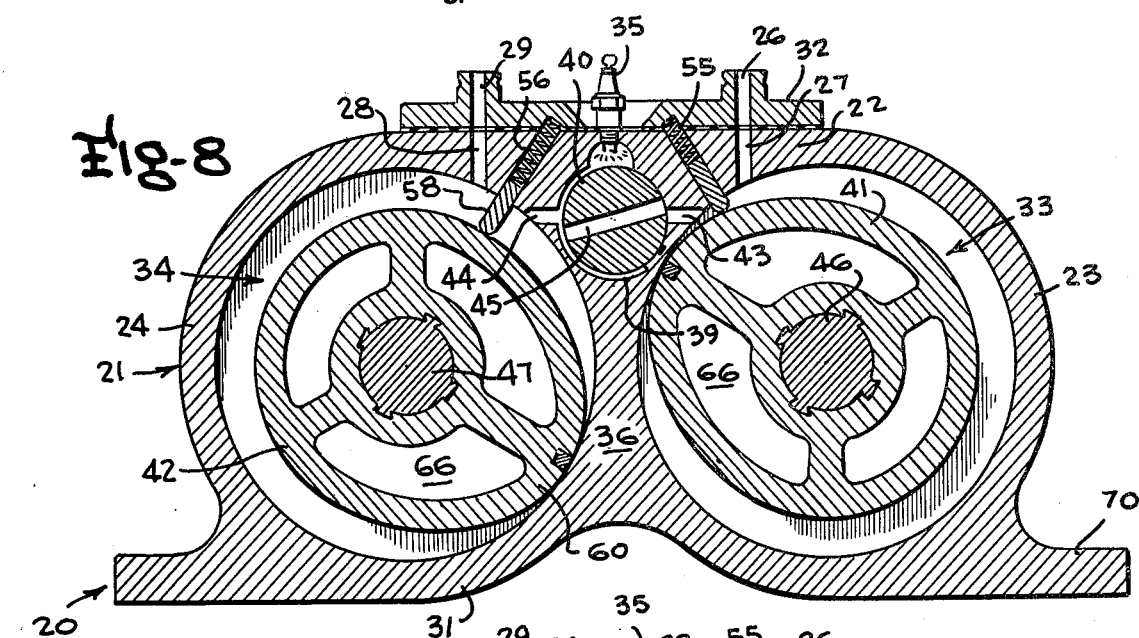
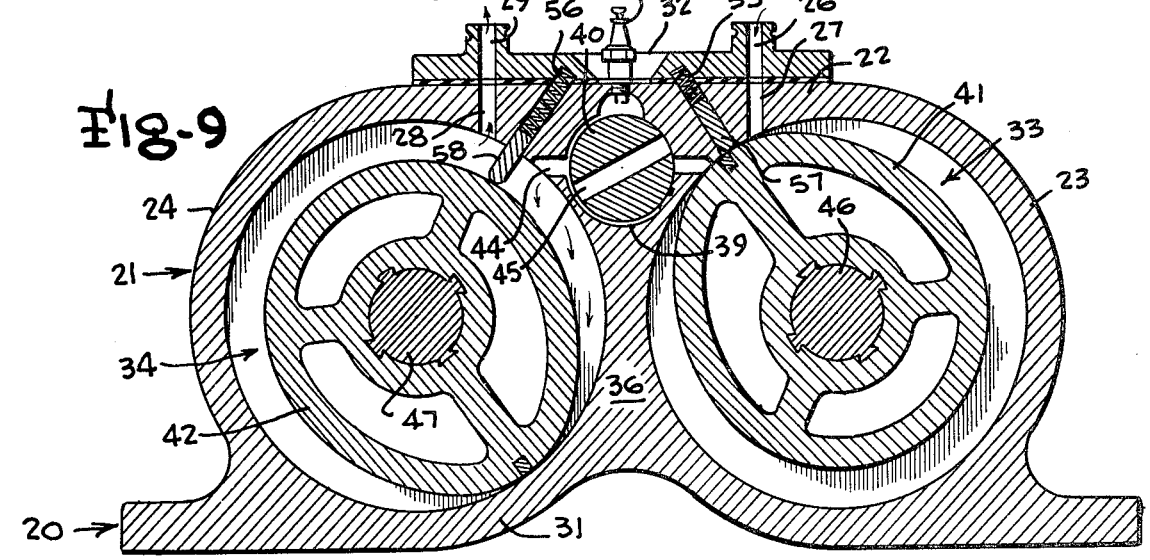

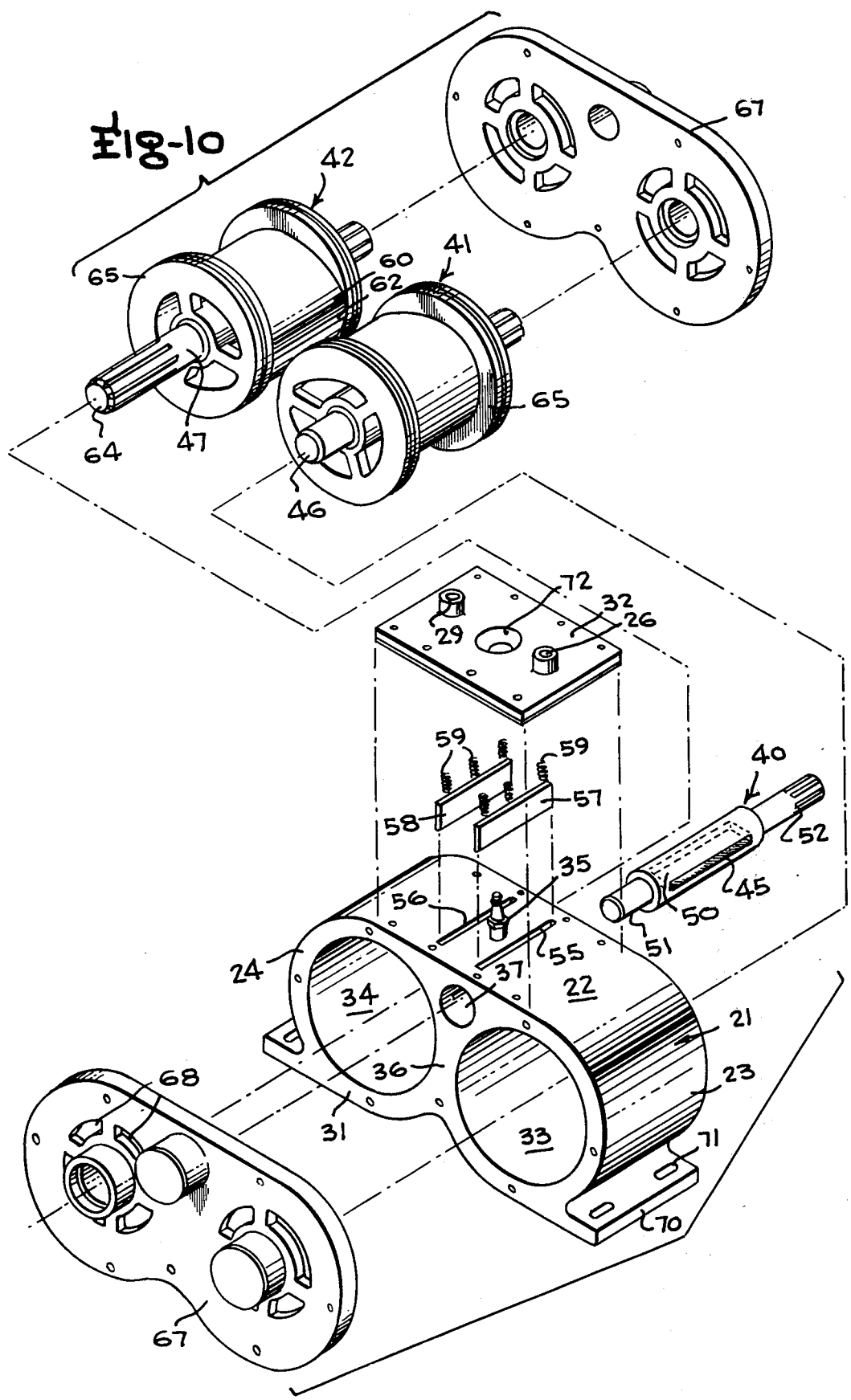

ROTARY ENGINE

BACKGROUND OF THE INVENTION

FIELD OF THE INVENTION

The present invention relates to rotary machines that can be used as rotary engines, compressors, and the like, and wherein there is provided rotors that rotate within chambers, there being a shaft or further rotor that selectively establishes communication with the chambers in which the pair of rotors revolve.

In accordance with the present invention there is provided a rotary machine that can be used as a rotary engine, pump and the like, wherein the rotary machine possesses certain important advantages over conventional piston engines that use a reciprocating motion, and wherein the present invention also possesses certain important differences and advantages over prior rotary machines.

The primary object of the present invention is to provide a rotary machine or engine that does not use a crank shaft or cam shaft or valves, or connecting rod or oil pan, and wherein the machine is air cooled, and the machine being capable of operating at a high speed and wherein efficiency is quite high.

Still another object of the present invention is to provide a rotary engine or machine that has improved characteristics and advantages as compared to previous machines.

Still another object of the present invention is to provide a rotary machine or engine that is generally rugged in construction, and simple and inexpensive to manufacture and operate.

Other objects and advantages of the present invention will become apparent in the following specification when considered in the light of the attached drawings.

BRIEF DESCRIPTION OF THE DRAWINGS

FIGS. 5 through 9 are views generally similar to FIG. 4 but showing the parts in a different or rotated position to illustrate the operations of the present invention;

FIg. 10 is a perspective view of the machine of the present invention showing the parts separated for clarity of illustration.

DESCRIPTION OF THE PREFERRED EMBODIMENT

Figure 4:
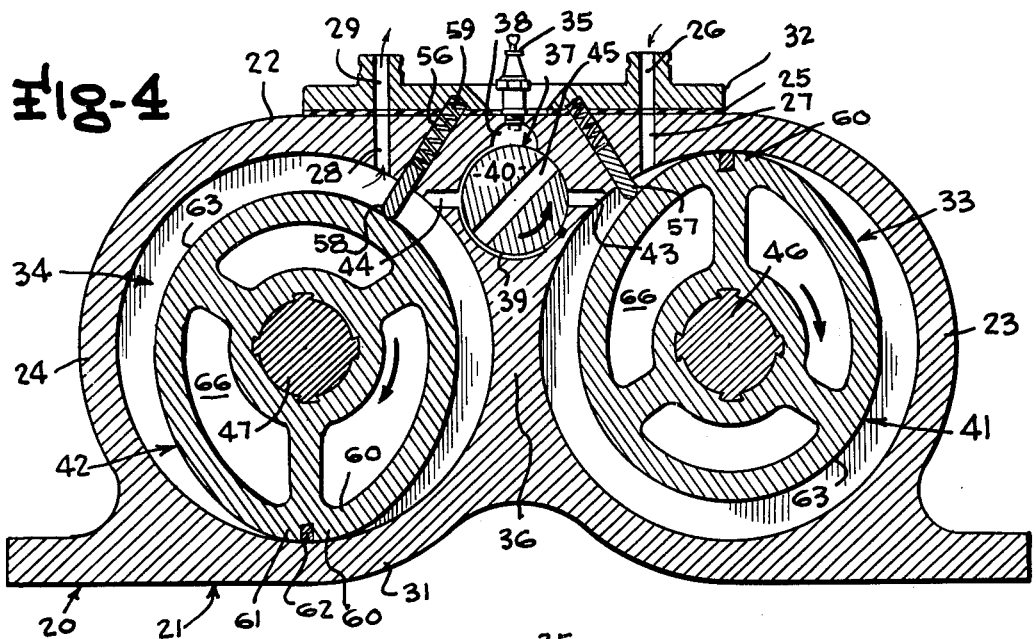
FIG. 4 is a sectional view taken on the line 4—4 of FIG. 2.

Referring in detail to the drawings, the numeral 20 indicates the rotary machine or engine of the present invention that includes a housing or cylinder 21, and the housing 21 includes portions 22 and 31, as well as end portions 23 and 24, FIG. 4. A plate 32 is mounted contiguous to the portion 22, and a gasket 25 is adapted to be interposed between the plate 32 and the portion 22. First registering passages 26 and 27 are provided in the plate 32 and housing 21, and the housing 21 is provided with a pair of spaced apart chambers 33 and 34 therein. The first passageways 26 and 27 define inlets for a mixture of air and fuel from a carburetor or the like so that air/fuel mixture from a suitable source of supply can be introduced into the chamber 33 as later described in this application. There is further provided passage ways 28 and 29 that register with each other, and these passageways 28 and 29 define exhaust passageways for the exhaust from the chamber 34. Suitable securing elements such as screws or bolts 30 are provided for fastening the plate 32 to the adjacent portion of the housing 21. The numeral 35 indicates a spark plug that is suitably mounted in the plate 32, and it is to be understood that various conventional accessories can be used wherever needed, such as for example suitable conventional means can be provided for selectively actuating the spark plug 35 to fire at the proper time.

The housing 21 is provided with a wall portion 36 that separates a pair of hollow chambers 33 and 34 that are formed in the housing. The numeral 37 indicates a bore that is provided or formed in the housing adjacent the upper portion of the wall portion 36, FIG. 4, and the bore 37 includes a section 38 that has the inner end of the spark plug 35 communicating therewith. The passageway or bore 37 further includes an enlarged section 39, and a shaft member or rotor 40 is rotatably mounted in the passageway 37. A pair of rotors 41 and 42 are rotatably mounted in the chambers 33 and 34, and as shown in the drawings, the rotors 41 and 42 are generally oval in cross section, or are in part elliptical and part circular.

A pair of channels or ports 43 and 44 selectively establish communication between the chambers 33 and 34 and the bore 37. The shaft member 40 has a slot or channel or passageway 45 therein, as shown in the drawings. As shown in FIG. 9, the shaft member 40 is in a position so that the channels 43 and 44 are closed and disconnected. Any remaining gas left in the passageway of the shaft member 40 can be discharged in the explosion chamber. The enlarged portion 39 of the bore or passageway 37 is provided for this purpose. The enlarged section or portion 39 permits the imprisoned gas in the slot of the shaft member to exhaust in the combustion chamber and this increases the efficiency of the motor.

Arranged on the ends of the shafts 46 and 47 that extend through the rotors 41 and 42 are gears 48 and 49. The shafts 46 and 47 are adapted to be suitably fixedly secured to their respective rotors 41 and 42, as for example, by means of keys. The shaft member 40 includes an enlarged cylindrical portion 50 as well as end portions 51 and 52, and the end portion 52 has a gear 53 thereon, there being an endless chain 54 arranged in meshing engagement with the gears 48, 49 and 53, whereby the rotors 41 and 42 and shaft member 40 will rotate in the desired manner and with the proper timing.

There is provided in the housing inclined slots or openings 55 and 56, and gates or valves 57 and 58 are slidably mounted in the openings 55 and 56, there being spring members 59 for urging or biasing the members into engagement with the outer surface of the rotors 41 and 42. The rotors 41 and 42 are shaped to define or include node portions 60 and 61 that have seals 62 mounted therein. Each of these rotors 41 and 42 further include outer rounded surfaces 63.

The shaft 47 includes an extending portion 64 that is adapted to be used for driving any suitable mechanism so that the shaft portion 64 defines an outlet shaft for operating the work or machinery with which the present invention is being used. As shown in FIG. 10, for example, each of the rotors 41 and 42 include end portions 65.

Figure 1:
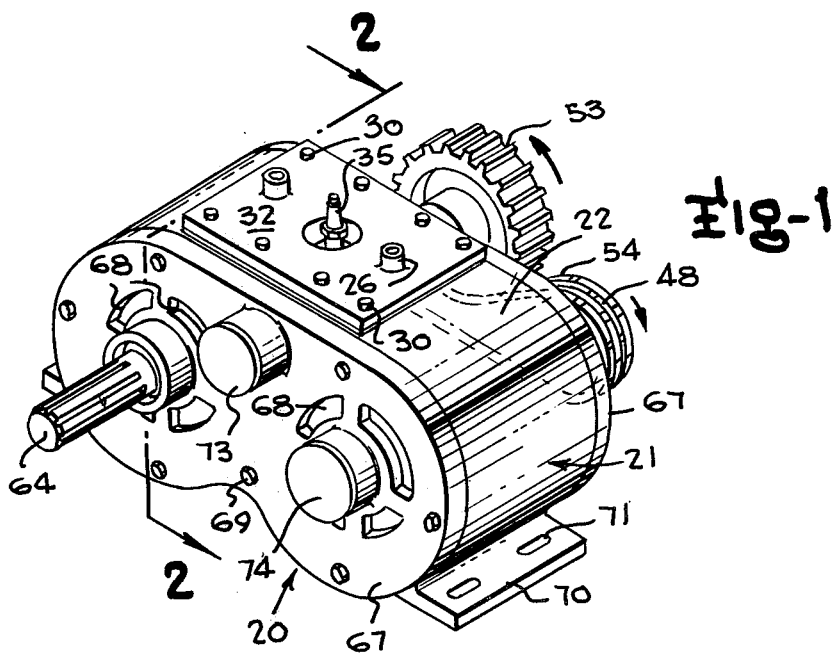
FIG. 1 is a perspective view of the rotary machine of the present invention.
Figure 3:
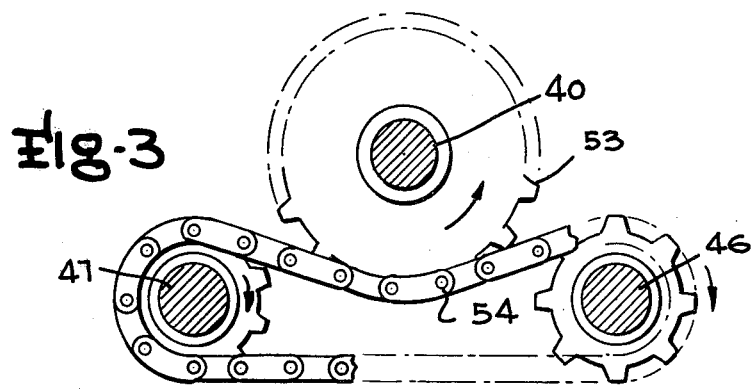
FIG. 3 is a sectional view taken on the line 3—3 of FIG. 2.
Figure 2:
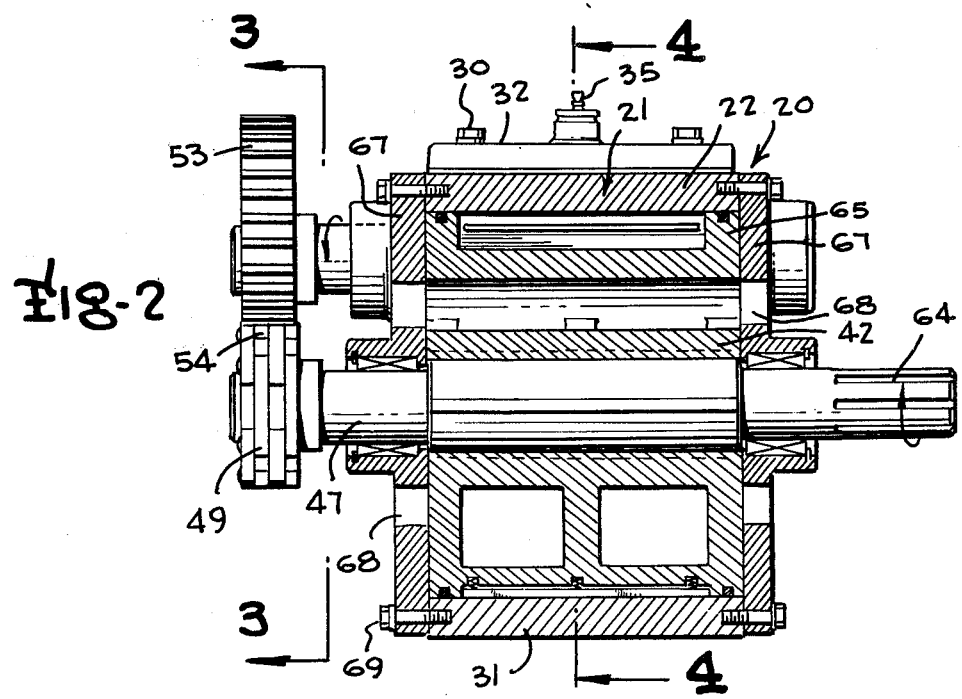
FIG. 2 is a sectional view taken on the line 2—2 of FIG. 1.

The interior of the rotors 41 and 42 are hollow as indicated by the numeral 66, and end pieces 67 are mounted on the housing 21, the end pieces 67 being provided with slots or openings 68, and wherein this construction assures that the machine will be air cooled, because as the rotors 41 and 42 rotate or turn, air can circulate into and out of the interior of the machinery through the opening 66 and 68 due to the movement of the rotors within the housing that will cause this air circulation to take place. The end pieces 67 can be fastened in place on the housing by means of securing elements 69, FIG. 1.

The lower portion of the housing 21 may be provided with flanges 70 that have openings or slots 71 therein, whereby suitable anchoring bolts can be extended through the slots 71 in order to anchor the device in place.

The plate 32 is provided with an opening 72 that defines or provides a mounting for the spark plug 35. The numerals 73 and 74 indicate end elements for members such as the shaft 40 and end of the shaft 46.

From the foregoing, it will be seen that there has been provided a rotary engine which is especially suitable for use as a driving force, and wherein the output shaft 64 can be used for imparting energy to rotate or drive any suitable member such as a vehicle or any other unit or machine. In use, with the parts as arranged as shown in the drawings, a mixture of air and fuel is introduced into the engine or machine 20 through the inlet openings 26 and 27, and the exhaust leaves the chamber 34 through the discharge openings 28 and 29. A housing 21 can be bolted or otherwise secured in place by means of securing elements extending through the opening 71. The housing 21 has the plates or end members 67 on each end thereof and the plates 67 have the openings 68 therein, so that as the rotors 41 and 42 turn, air will be caused to circulate through the hollow spaces 66 and through the openings 68 so that the entire machine will be air cooled, and whereby it is not necessary to use oil or the like or any liquid to cool the machine. There is provided the two rotating members 41 and 42 that function as valves. As shown in FIG. 4, the pair of rotors 41 and 42 always rotate or travel in the same direction as indicated by the arrows; that is, the pair of rotors 41 and 42 always rotate in a clockwise direction. The rotor or shaft member 40 always rotates in the opposite direction from the pair of rotors 41 and 42; that is, the rotor 40 turns in the direction indicated by the arrow, FIG. 4 in a counterclockwise direction.

Figure 5:
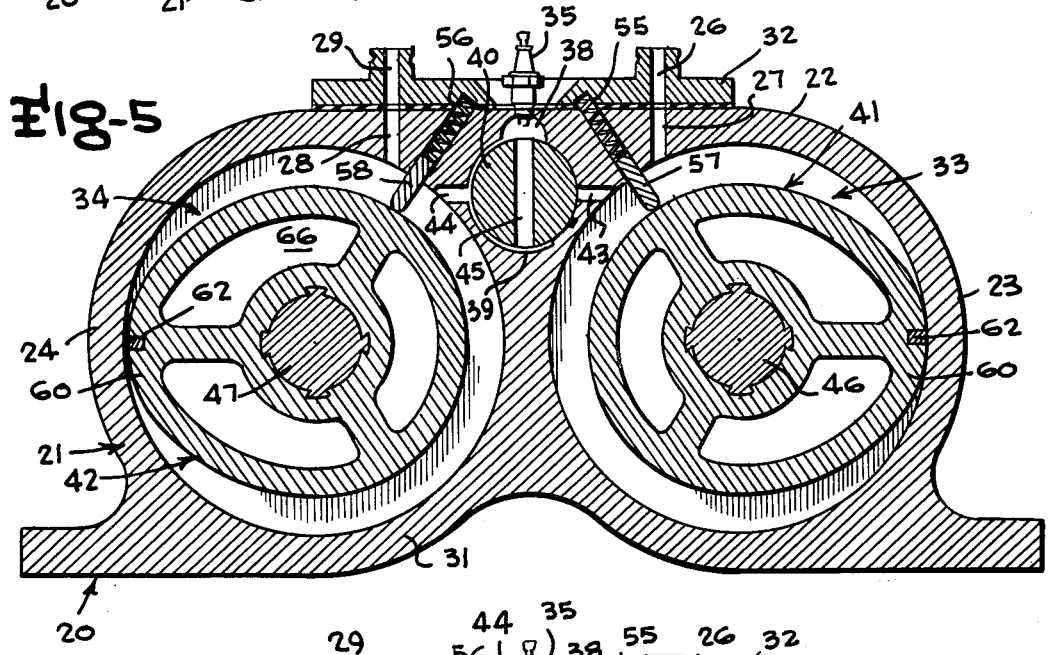
Figure 6:
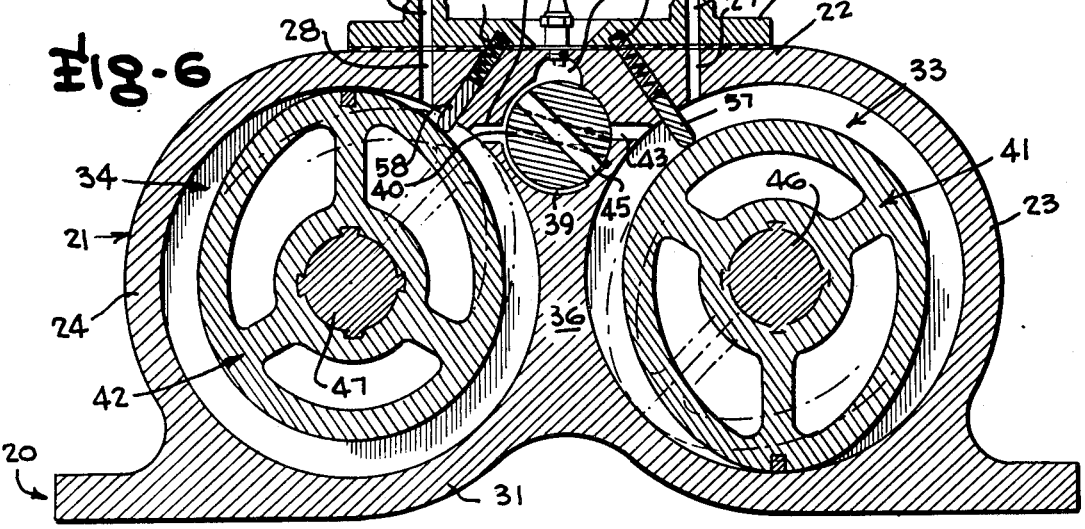

Referring further to FIG. 4, as the rotor 41 rotates, it draws or sucks in fuel and air through the passageway 27 into the chamber 33, and the rotor 40 rotates until it has its passageway 44 establishing communication with the chambers 33 and 34 through the channels 43 and 44. Initially, fuel is just being compressed. In FIG. 4 the seal 62 on the node 60 of the rotor 41 is arranged so that fuel is being sucked in and compressed. FIGS. 5 and 6 show the steps of the fuel and air being subsequently additionally compressed. Similarly, in FIG. 5 the shaft or rotor 40 is shown rotated in a different position from that illustrated in FIG. 4, as the shaft 40 rotates within the chamber or bore 37. As shown in FIG. 4, the spring urged gates 57 and 58 are biased into engagement with the outer surface of the rotors 41 and 42. FIG. 6 shows the parts such as the rotors 41, 42 and 40 in a different position and with the effective size of the chambers for the rotors 41 and 42 being smaller. In FIG. 7, the valve or member 40 is open so that compressed air and fuel in the chambers can flow from the proper portion of the chamber 33, through the port 43, then through the channel 45, then through the port 44 and into the proper part of the chamber 34. As shown in the drawings, the bore 37 includes an enlarged portion 39 which is slightly larger in diameter than the diameter of the corresponding portion of the shaft 40.

In FIG. 8, there is illustrated the moment when the spark from the plug 35 fires or ignites the fuel/air mixture so that this ignited fuel and air mixture will explode against the proper surface of the rotor 42 to cause the rotor 42 to revolve. As the rotor 42 revolves, it turns its shaft 47, and because the shaft 47 has the gear 49 thereon, it will be seen that this will result in rotation of the gear 49. Because the chain 54 engages the gears 49 and 48 and 53, it will be seen that this will cause rotation of the rotors 41 and 42 in a clockwise direction while at the same time causing counterclockwise rotation of the shaft or rotor 40. FIG. 9 illustrates the parts completely closed and with the parts or elements such as the rotor 42 still being pushed around by the ignited fuel. The parts then return to the position from that shown in FIG. 9 to a position such as that shown in FIG. 4 so that the cycle is continuous, wherein more fuel and air are sucked into the chamber 33 and the exhaust discharges out from the chamber 34 through the openings 28 and 29.

With reference to a figure such as FIG. 5, the rotor 41 is rotating twice as fast as the rotor 40, FIG. 4, and these elements rotate in opposite directions relative to each other. The operation is continuous with fuel coming all the time and exhaust leaving all the time. Power is supplied for any desired purpose by means of the output shaft section 64. If additional power is desired or needed, several of the units can be arranged together and these may be mounted in end to end relationship and suitable angular mounting relationships can be used, as for example, depending on the number of units being used.

It will therefore be seen that there has been provided an engine which includes a pair of pistons or rotors 41 and 42, as well as the cylinder or housing 21 and the split shaft 40, as well as the fuel inlet and the exhaust. In operation, the rotors 41 and 42 are interconnected by means of cog wheels or gears and the chain 54 is such that both of the rotors or pistons 41 and 42 turn in unison in a clockwise direction, with the shaft 40 rotating at half the speed of the rotor such as the rotor 42.

FIGS. 4 through 9 illustrate different positions of the parts as the engine is operating. For example, in FIG. 4, the mixture of air and fuel from the carburetor and inlet 27 will be compressed, and this action will continue until the rotor 41 is in the position shown in phantom line in FIG. 6. In this position, the split shaft 40 connects the two channels as shown in phantom line, so that compressed air will go from the right side to the left side as shown in FIG. 7. This is continued until the pistons are in a position such as that shown in FIG. 8. It is to be noted that the split shaft 40 is open for approximately 45°, while the rotor 41 is progressing 90° from the position shown in phantom line of FIG. 6, when the gas volume is approximately ⅛ of the first names gas volume. In this position, as shown in FIG. 8, the spark plug 35 ignites the fuel and the gas pressure increases to an amount such as 40 atmospheres, and the rotor 42 will discharge the exhaust. It is to be noted that the rotor or piston 41 has several functions; that is, it creates suction and compression, and the rotor 42 functions as the explosion means as well as causing the exhaust to be discharged. In FIG. 9, the shaft 40 is in a position so that the channels 43 and 44 are closed and disconnected. Any remaining gas left in the passageway of the shaft 40 can be discharged in the explosion chamber. The enlarged portion 39 of the passageway 37 is provided for this purpose.

For additional power, a plurality of units can be provided, or the movement of the parts can be adjusted.

Some of the advantages of the present invention are as follows: No crank shaft, cam shaft and the like are required; no connecting rod is used, and no oil pan is needed. The device can be made so that it is light in weight, the machine is air cooled; it is easy to build and repair; there is very little wear on the parts. The present invention is such that the disadvantages of prior rotary engines are prevented. The device can operate at high speed and at high revolutions, and with maximum efficiency.

It is to be understood that the shaft 64 can be used for supplying power or for operating any type of mechanism, including a vehicle, but the same is not limited to such a member, since it can be used for operating any unit where power is required.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

What is claimed is:

1. An air cooled rotary engine comprising a housing having a pair of hollow chambers therein, a plate affixed to said housing, air fuel inlet means communicating with one of said chambers, exhaust means communicating with the other chamber, spark plug means mounted in said plate, said housing embodying a wall portion separating said pair of chambers, said housing being provided with a bore therein, there being channels in said wall portion selectively establishing communication between said chambers and said bore, a pair of hollow rotors rotatably mounted in said chambers, a shaft member rotatably mounted in said bore, said bore embodying an enlarged portion which is greater in diameter than the diameter of the shaft member extending therethrough, said shaft member having a passageway therein, the passageway in said shaft member being mounted for movement into and out of registry with said channels, shafts extending through said rotors and operatively connected thereto, gear members on said shafts, and shaft member, an endless chain having said gear members arranged in meshing engagement therewith, there being inclined openings in said housing, gate members slidably mounted in said openings, spring members for biasing said gate members into engagement with the outer surfaces of the rotors, said pair of rotors rotating at the same speed and in the same direction relative to each other, said shaft member rotating at one half the speed of the rotors, said shaft member rotating in the opposite direction from the rotors, said rotors being partially elliptical and partially circular in cross section, said shafts being of one piece construction.

* * * * *